UNITED STATES PATENT OFFICE.

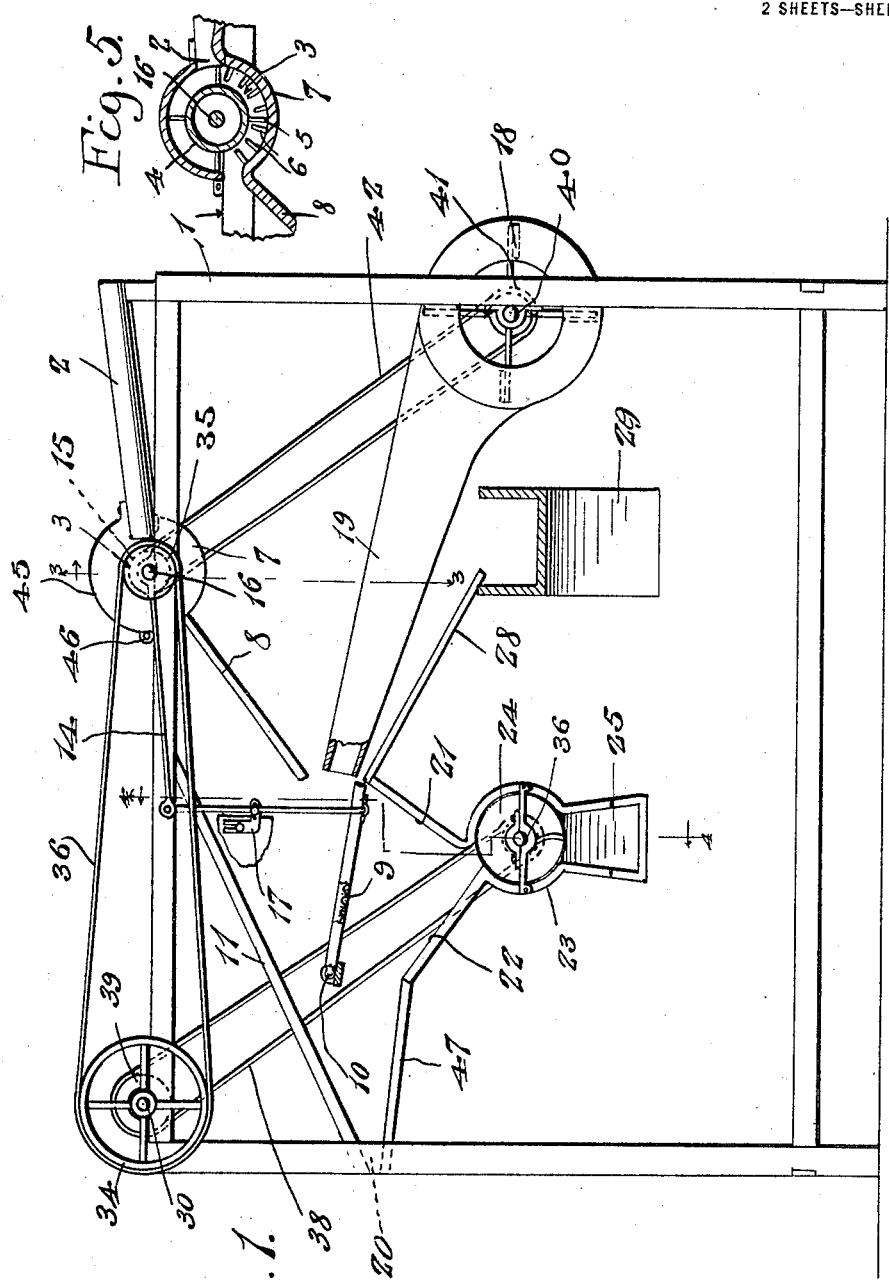
W. F. SURRATT.
HULLER.
APPLICATION FILED MAY 10, 1916.
1,324,185.
Patented Dec. 9, 1919.
2 SHEETS—SHEET 1.
Witness:-
J. P. Wahler
Robt Meyer
Inventor
W. F. Surratt.
By [signature]
Attorney

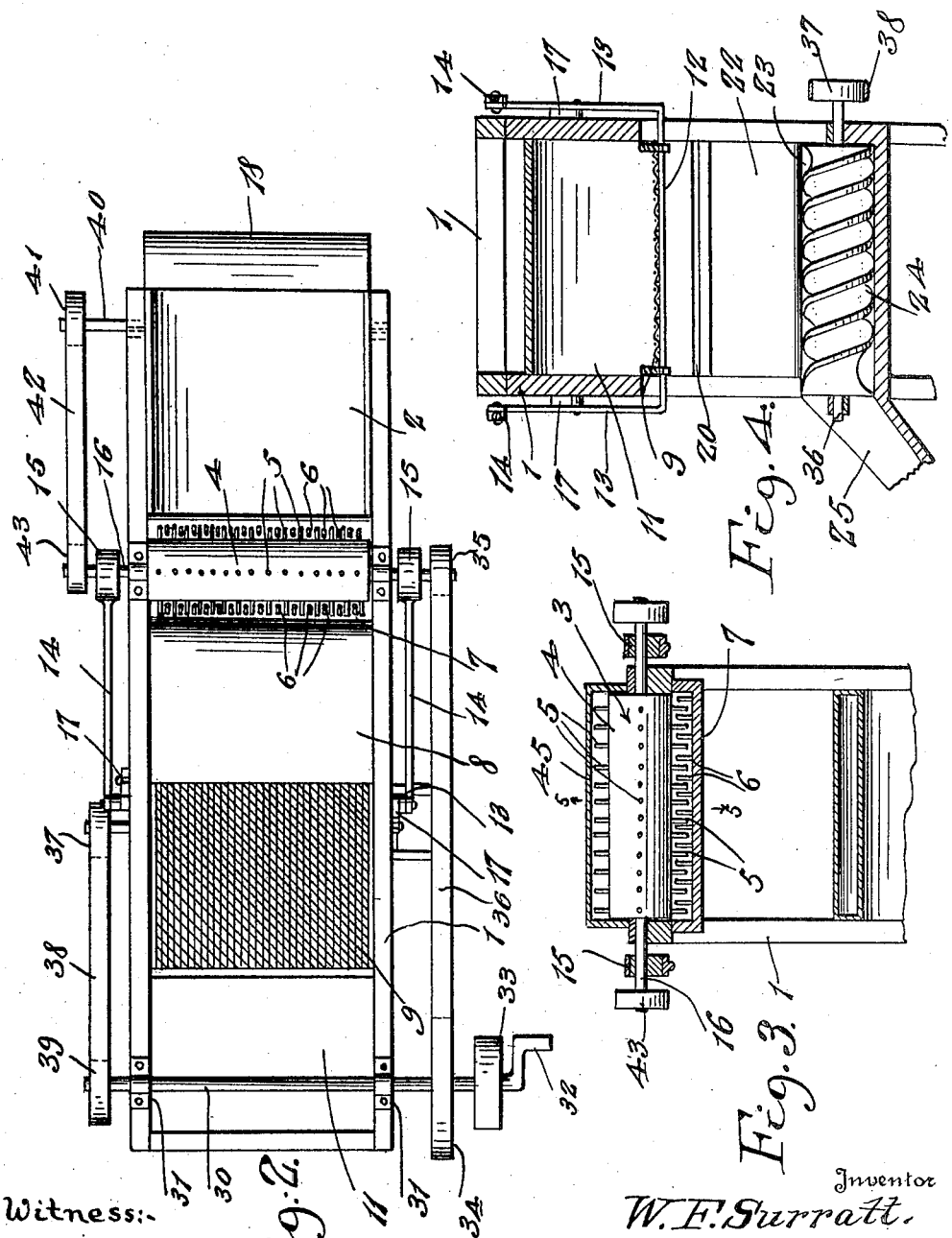

WILLIAM F. SURRATT, OF HEBER SPRINGS, ARKANSAS, ASSIGNOR OF ONE-HALF TO ROBERT E. SHAFER, OF HEBER SPRINGS, ARKANSAS.

HULLER.

1,324,185.  Specification of Letters Patent.  Patented Dec. 9, 1919.

Application filed May 10, 1916. Serial No. 96,582.

*To all whom it may concern:*

Be it known that I, WILLIAM F. SURRATT, a citizen of the United States, residing at Heber Springs, in the county of Cleburne and State of Arkansas, have invented certain new and useful Improvements in Hullers; and I do hereby declare the following to be a full, clear, and exact description of the invention, such as will enable others skilled in the art to which it appertains to make and use the same.

This invention relates to a huller or thresher for peas, beans or the like, and the primary object of the invention is to provide a device which is comparatively simple in construction, and which will thoroughly thresh peas, beans or the like, and efficiently separate the pods from the threshed peas, and the partially threshed peas or pods from the threshed peas, without injuring the peas, beans or the like.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved huller showing one side of the supporting casing of the same removed.

Fig. 2 is a top plan view of the huller.

Fig. 3 is a section on the line 3—3 of Fig. 1.

Fig. 4 is a section on the line 4—4 of Fig. 1, and

Fig. 5 is a section on the line 5—5 of Fig. 3.

Referring more particularly to the drawings, 1 designates the supporting frame of the improved huller or thresher as an entirety, which is provided with a feed board 2. The feed board 2 is carried by the top of the supporting structure 1 and it inclines downwardly, for guiding the peas, beans or the like to the rotary cylinder structure generically indicated by the numeral 3.

The cylinder structure which is generically indicated by the numeral 3 comprises the rotary drum 4 which has a plurality of radiating teeth 5 carried thereby, in spaced rows as clearly shown in Figs. 2 and 3 of the drawings. The teeth 5 of the cylinder 4 coact with the teeth 6 of the concave 7, for breaking up the pods of the peas, beans or the like. The peas or beans are discharged from the concave 7 upon a guiding platform 8 which guides them downwardly to the riddle or screen 9. The riddle 9 is hingedly connected as shown at 10 to the under surface of a partition 11 which extends downwardly through the interior of the supporting structure 1 and it has a rod 12 extending across beneath the bottom of the riddle, which rod has its ends upturned as shown at 13, forming a substantially U-shaped rod. The upper ends of the legs of the U-shaped rod 12 are connected through the medium of rods 14 to eccentrics 15 which are mounted upon the drive shaft 16 of the cylinder 4 so that the U-shaped rod 12 will be rocked for rocking or vibrating the riddle or screen 9 during the hulling or threshing operation of the device.

A fan structure 18 is provided which has a spout 19 communicating with the outlets thereof. The spout 19 extends upwardly through the interior of the casing or supporting structure 1 so as to guide the blast of air over the riddle 9, for blowing the small particles of the pods free from the peas or beans, and outwardly through an opening 20.

The hulled or threshed peas or beans will fall through the riddle 9 and be guided by partitions 21 and 22 into a trough 23. An auger 24 is rotatably mounted in the trough 23 for engaging the threshed peas or beans and conveying them transversely of the supporting structure 1 into a downwardly inclining spout 25, which may guide them into any suitable type of a retaining receptacle.

The pods and peas which are only partially hulled or threshed will travel off the inner end of the riddle 9, during the vibratory movement of the riddle and over an inclined plate 28 into a tailings box or chute 29 from which they may be removed and deposited upon the feed board 2 for repassage through the huller or thresher.

A power shaft 30 is rotatably supported by suitable bearings 31 which are carried by the suporting structure 1 and it has a crank handle 32 formed upon one end of the same by means of which the shaft may be manually rotated. A pulley 33 is also mounted upon the shaft through the medium of which any suitable type of prime mover may be operatively connected to the shaft if it is desired to rotate the shaft by power other than manual power.

A pulley 34 is mounted upon the shaft 30 and a second pulley 35 is mounted upon the shaft 16. A belt 36 travels about the pulleys 34 and 35 for transmitting power from the power shaft 32 to the shaft 16 for rotating the cylinder 4. The auger shaft 36 which rotates the auger 24 has a pulley 37 mounted thereon about which a belt 38 travels. The belt 38 also travels about a pulley 39 mounted upon the power shaft 30 for operating the auger by the operation of the power shaft. The shaft 40 of the fan structure 18 has a pulley 41 mounted thereon about which a belt 42 passes. The belt 42 also travels about a pulley 43 carried by the shaft 16.

A hood 45 is hingedly connected as shown at 46 to the supporting structure 1 and it extends over the cylinder for preventing the peas from flying out of the machine. The guiding board 22 has an extension 47 formed thereon which coacts with the partition 11 for properly guiding the chaff or broken pods out of the supporting casing 1.

From the foregoing description taken in connection with the accompanying drawings the advantages of construction and of the method of operation of the improved huller will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

In a huller, a supporting frame, threshing means, a downwardly and forwardly inclined board positioned to receive threshed material from said threshing means, a downwardly and rearwardly inclined riddle positioned to receive material adjacent its lower end from said board, a blower structure having a discharge spout inclined forwardly and upwardly at an angle to said riddle with its discharge end positioned adjacent the lower edge of said board, means positioned beneath said riddle for collecting and receiving peas passing through the same, means for directing materials discharged from the lower end of the riddle away from said collecting and receiving means; a forwardly and downwardly inclined partition member positioned above and in advance of said riddle for directing the blast of air discharged from said spout and the lighter particles of materials carried thereby downwardly and forwardly of the casing, and a deflector board positioned below and in spaced relation to the forward portion of said partition member and coacting therewith to confine the air blast.

In testimony whereof I affix my signature in presence of two witnesses.

WILLIAM F. SURRATT.

Witnesses:
 H. M. MOORE,
 H. N. CASE.